US007655476B2

(12) United States Patent
Bui

(10) Patent No.: US 7,655,476 B2
(45) Date of Patent: Feb. 2, 2010

(54) REDUCTION OF SCAN TIME IN IMAGING MASS SPECTROMETRY

(75) Inventor: Huy A. Bui, Fremont, CA (US)

(73) Assignee: Thermo Finnigan LLC, San Jose, CA (US)

(*) Notice: Subject to any disclaimer, the term of this patent is extended or adjusted under 35 U.S.C. 154(b) by 484 days.

(21) Appl. No.: 11/313,203

(22) Filed: Dec. 19, 2005

(65) Prior Publication Data

US 2007/0141719 A1 Jun. 21, 2007

(51) Int. Cl.
*G01N 24/00* (2006.01)

(52) U.S. Cl. .......................... 436/173; 702/23; 382/128

(58) Field of Classification Search ................. 436/173; 702/23; 382/128

See application file for complete search history.

(56) References Cited

U.S. PATENT DOCUMENTS

| | | | | |
|---|---|---|---|---|
| 5,272,338 | A | 12/1993 | Winograd et al. | |
| 5,498,545 | A * | 3/1996 | Vestal | 436/47 |
| 5,808,300 | A | 9/1998 | Caprioli | |
| 6,680,477 | B2 | 1/2004 | Beck et al. | |
| 6,756,586 | B2 * | 6/2004 | Caprioli | 250/282 |
| 7,145,135 | B1 * | 12/2006 | Overney | 250/288 |
| 7,411,183 | B2 * | 8/2008 | Overney et al. | 250/282 |
| 2004/0183006 | A1 * | 9/2004 | Reilly et al. | 250/282 |
| 2004/0217278 | A1 * | 11/2004 | Overney et al. | 250/288 |

OTHER PUBLICATIONS

Bouschen, et al., "SMALDI Imaging at 1um Lateral Resolution," Proceedings of the 52nd ASMS Conf. on Mass Spectrom and Allied Topics, (May 23, 2004), Schriver, et al., "High Resolution Imaging Mass Spectrometry: Characterization of Ion Yields and Laser Spot Sizes," Vanderbuilt Univ. (Nashville).

Chaurand, et al., "MALDI-MS Imaging of Tissue Sections with a Resolution of 10 Microns," Vanderbuilt Univ.; Univ. of Giessen (Nashville, USA; Giessen, Germany).

Caldwell, et al., "Tissue Profiling by Mass Spectrometry: A Review of Methodology and Applications," MCP Papers in Press; Manuscript R500006-MCP200. (Jan. 26, 2005).

Caprioli, et al., "Molecular Imaging of Biological Samples: Localization of Peptides and Proteins Using MALDI-TOF MS," Anal. Chem., p. 4751-4760, (1997).

Stoeckli, et al., "Imaging Mass Spec: A New Technology for the Analysis of Protein Expression in Mammalian Tissues," Nature Medicine, Nature Publishing Group, vol. 7 (No. 4), p. 493-496, (Apr. 2001).

"Generation of Three-Dimensional Images in Mass Spectrometry," TransMIT Society for Technology Transfer; Dept. of Patents and Innovations, Technology Access by HIPO.

(Continued)

*Primary Examiner*—Michael A Marcheschi
*Assistant Examiner*—Jonathan M Hurst
(74) *Attorney, Agent, or Firm*—Charles B. Katz

(57) ABSTRACT

Techniques are disclosed for reducing scan times in mass spectral tissue imaging studies. According to a first technique, a tissue imaging boundary is defined that closely approximates the edges of a tissue sample. According to a second technique, a low-resolution scan is performed to identify one or more areas of interest within the tissue sample, and the identified areas of interest are subsequently scanned at higher resolution.

8 Claims, 11 Drawing Sheets

OTHER PUBLICATIONS

"Manufacturing of MALDI Matrices for Spatially Resolved Microrange Analytics," TransMIT Society for Technology Transfer, Technology Access by HIPO.

Bouschen, et al., "Automated 3D-SMALDI Imaging with a Lateral Resolution of 1um," Institute of Inorganic and Analytical Chemistry, Univ. of Giessen (Germany).

Luxembourg, et al., "High-Spatial Resolution Mass Spectrometric Imaging of Peptide and Protein Distributions on a Surface," Anal. Chem., vol. 76 ( No. 18), p. 5339-5344, (Sep. 15, 2004).

Spengler, et al., "SMALDI Imaging at 1 Micrometer Lateral Resolution" Proceedings of the 52nd ASMS Conference on Mass Spectrometry and Allied Topics (May 23, 2004).

Piyadasa, et al., "Imaging MALDI with an Orthogonal TOF Mass Spectrometer," Preceedings of the 52nd Conf. on Mass Spectrom and Allied Topics, (May 23, 2004).

* cited by examiner

REDUCTION OF SCAN TIME IN IMAGING MASS SPECTROMETRY

FIELD OF THE INVENTION

The present invention relates generally to the field of mass spectrometry, and more particularly to techniques and apparatus for analyzing the spatial distribution of substances in a tissue sample using a mass spectrometer.

BACKGROUND OF THE INVENTION

Mass spectrometry has become an essential analytical tool for the identification and quantification of both small molecules (e.g., drugs and their metabolites) and large molecules (e.g., polypeptides). Recently, there has been growing interest in the use of mass spectrometry for tissue imaging, which is the generation of spatially resolved maps depicting the distribution of one or more substances in a tissue sample. This technique has been described in numerous prior art references including, for example, U.S. Pat. Nos. 5,808,300 and 6,756,586, both to Caprioli. Mass spectral tissue imaging has a number of highly promising applications, including as a tool for the study of the metabolism and distribution of drugs in normal and cancerous tissue.

The basic process of mass spectral tissue imaging may be more easily explained with reference to FIG. 1, which depicts a tissue sample 102 held on a sample support plate 104. The tissue sample may be specially prepared, e.g., by application of an overlying matrix layer, to provide enhanced radiation absorption and consequent ion production. In accordance with the prior art technique, the operator specifies a rectangular area 106 defined by boundary 108 for mass spectral imaging. The boundary 108 will typically be sized and positioned such that the entire tissue sample lies within the area to be imaged. The mass spectral tissue image is generated by sequentially irradiating a large number of spatially separated target regions 112 (which may be ordered in a rectilinear grid with constant lateral spacing between adjacent target regions) that span the imaging area 106, and measuring the abundance of one or more molecules by analysis of the mass-to-charge ratios of the ions produced by irradiating each target region. A visual representation of the distribution of selected molecules may be constructed by assigning different colors or luminosities to ranges of molecular abundances; for example, a region having a high abundance of a selected molecule may be displayed as a bright area, whereas a region devoid of the selected molecule may be displayed as a dark area. It is notable that when the tissue sample has an irregular or otherwise non-rectangular shape, as depicted in FIG. 1, a substantial fraction of the target regions 112 will be located outside of the region occupied by the tissue sample, i.e., on the bare sample plate, and irradiation of such target regions will not yield meaningful data.

One of the major obstacles to the widespread use of tissue imaging as a standard industrial analytical technique is the lengthy analysis (scan) time required to obtain a mass spectral image. Generally, mass spectral imaging is performed at a uniform high spatial resolution over the entire tissue sample in order to ensure that areas of interest within the tissue sample (e.g., those areas where a highly differentiated analyte spatial distribution occurs) are adequately resolved. Generation of a mass spectral image for a typical tissue sample of 1 $cm^2$ can require several hours or even days of instrument time. While these lengthy scan times may not be of paramount concern in research settings, there is a need to shorten the scan times before mass spectral imaging tools can be routinely and effectively deployed in pharmaceutical testing laboratories or other environments in which high sample throughput is required.

There have been a number of prior attempts to reduce mass spectral imaging scan times. These attempts have been largely focused on shortening the time required to acquire mass spectra at each target region (e.g., by reducing the number of laser pulses, increasing the laser repetition rate; or increasing the scan rate of the mass analyzer), or reducing the repositioning times associated with moving the laser beam from one target region to the next. However, such approaches may compromise the quality of the mass spectral data and/or require substantial modification of the hardware components to implement.

SUMMARY

Embodiments of the present invention include two techniques for reducing mass spectral tissue imaging analysis times. The techniques may be implemented separately or in combination. The first technique involves capturing an image of the tissue sample and constructing a non-rectangular tissue imaging boundary. The tissue imaging boundary may be constructed, for example, by displaying the tissue sample on a computer monitor and receiving operator input in the form of the free-drawn line that encompasses the tissue sample or areas of interest therein. The operator input is converted into a set of coordinates in physical space that define the tissue imaging boundary, and a set of spaced apart target regions that lie within the tissue imaging boundary are then selected for irradiation. Because the non-rectangular tissue imaging boundary will typically more closely approximate the tissue sample edges or limits of areas of interest relative to a standard rectangular boundary, the number of irradiated target regions that lie outside of the tissue sample or areas of interest may be significantly reduced, and the time required for completing the tissue imaging analysis will be correspondingly decreased. In certain implementations of this technique, it may be advantageous to define the tissue imaging boundary prior to performing sample preparation steps, such as application of a matrix layer, which may obscure the tissue sample edges from view. In such implementations, the tissue sample, typically adhered to a sample support plate, may be loaded into the mass spectrometer prior to completion of sample preparation in order to capture the tissue image and define the tissue imaging boundary, and subsequently removed from the mass spectrometer so that the remaining sample preparation steps may be conducted. The tissue sample and support plate are then re-loaded into the mass spectrometer for irradiation of the target regions and construction of a mass spectral image.

The second technique involves a multi-step imaging process, wherein an initial tissue imaging scan is performed to obtain a mass spectral image at relatively low resolution (i.e., with relatively large average spacing between adjacent target regions) in order to identify areas of interest within the tissue sample, for example, areas that have highly differentiated analyte abundances. The target regions may be randomly distributed to increase the likelihood of locating the highly differentiated areas within the tissue sample. A subsequent scan of the areas of interest is performed with reduced target region spacing to obtain high-resolution mass spectral imaging of the areas of interest. This multi-scan technique is significantly more efficient and less time-consuming than the prior art technique because high-resolution imaging is only performed on areas of interest rather than throughout the entire tissue area.

DETAILED DESCRIPTION OF EMBODIMENTS

Figure 1:
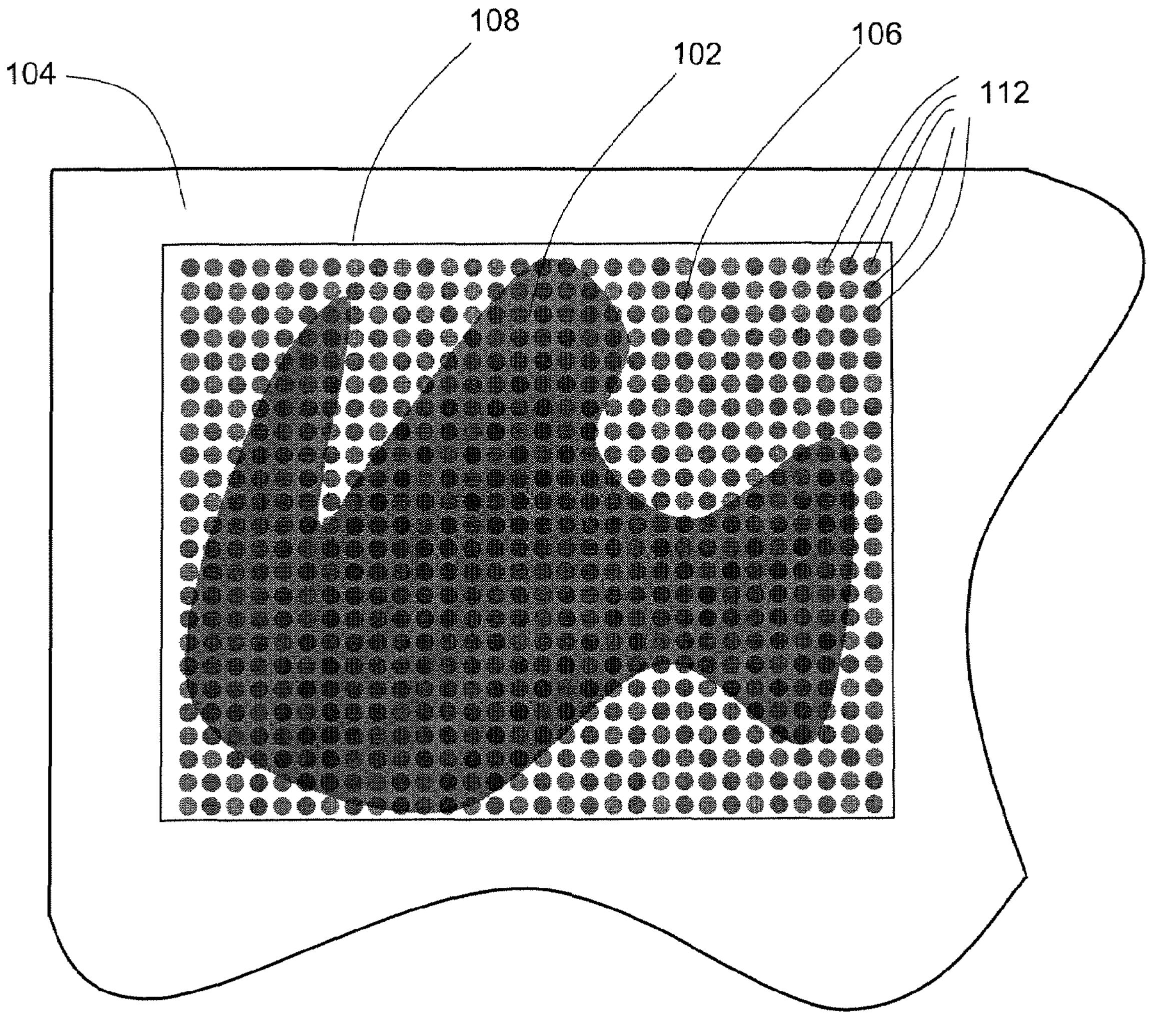
FIG. 1 depicts a tissue sample and superimposed irradiation target regions, wherein the tissue imaging boundary is defined in accordance with the prior art technique.
Figure 2:
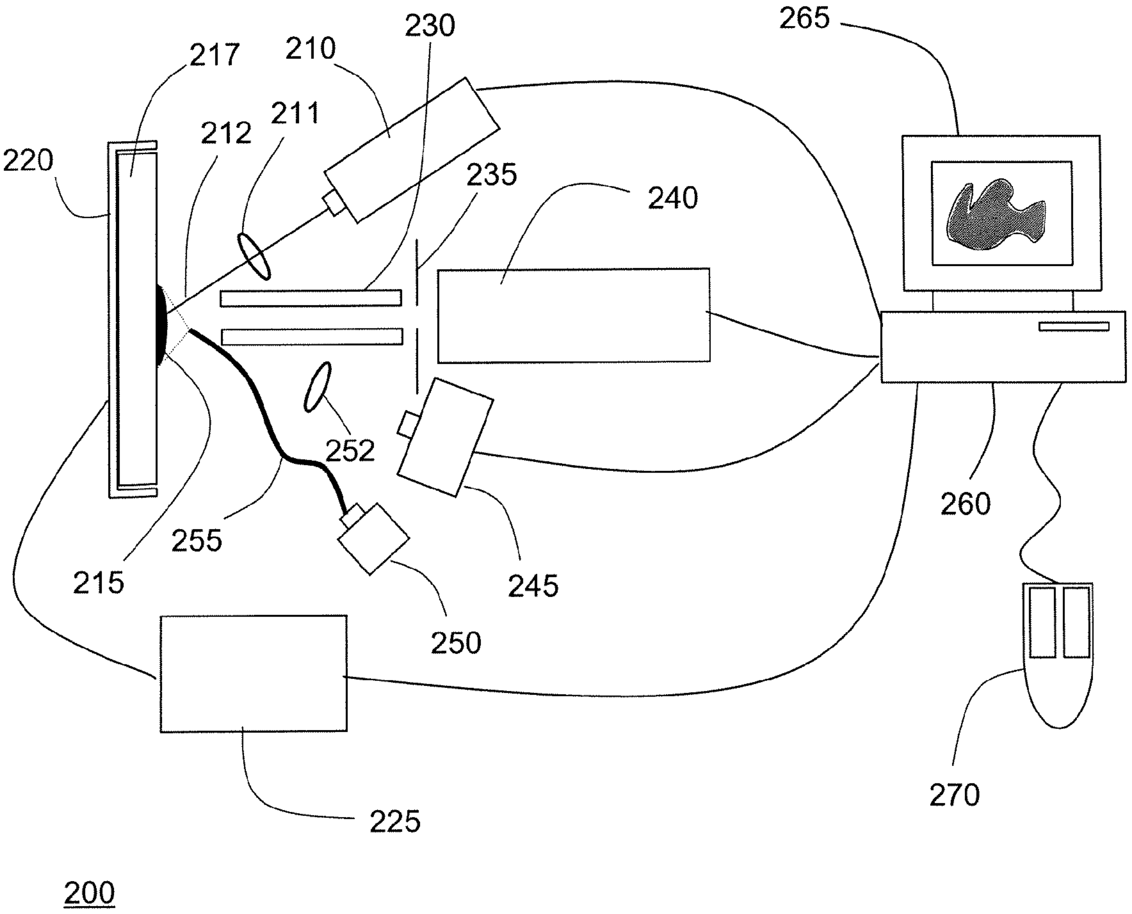
FIG. 2 is a symbolic diagram showing an example of a mass spectrometer architecture in which the techniques of the present invention may be implemented.

FIG. 2 is a symbolic diagram showing the components of an exemplary mass spectrometer 200 in which the techniques of the present invention may be implemented. As shown, MS system 200 includes a laser 210 positioned to direct a pulsed beam of radiation 212 onto a portion of a tissue sample 215 arranged on sample plate 217. A sample plate holder 120 is provided with a positioning mechanism, such as an X-Y stage, to align the laser spot (the impingement area of the laser beam) with a selected region of sample plate 115. Sample plate holder 220 is typically positioned in the X-Y plane (the plane defined by sample plate 217) by means of stepper motors or similar actuators, the operation of which is precisely controlled by signals transmitted from controller 225. The radiation emitted by laser 210 will typically be focused by at least one lens or equivalent optical element 211 disposed between the laser and the tissue sample. In alternate configurations, alignment of the laser spot with a selected region of sample plate 217 may be achieved by maintaining the sample plate 217 stationary and steering laser beam 212 by moving laser 210 or mirrors or other optical elements disposed in the laser beam path.

Figure 3:
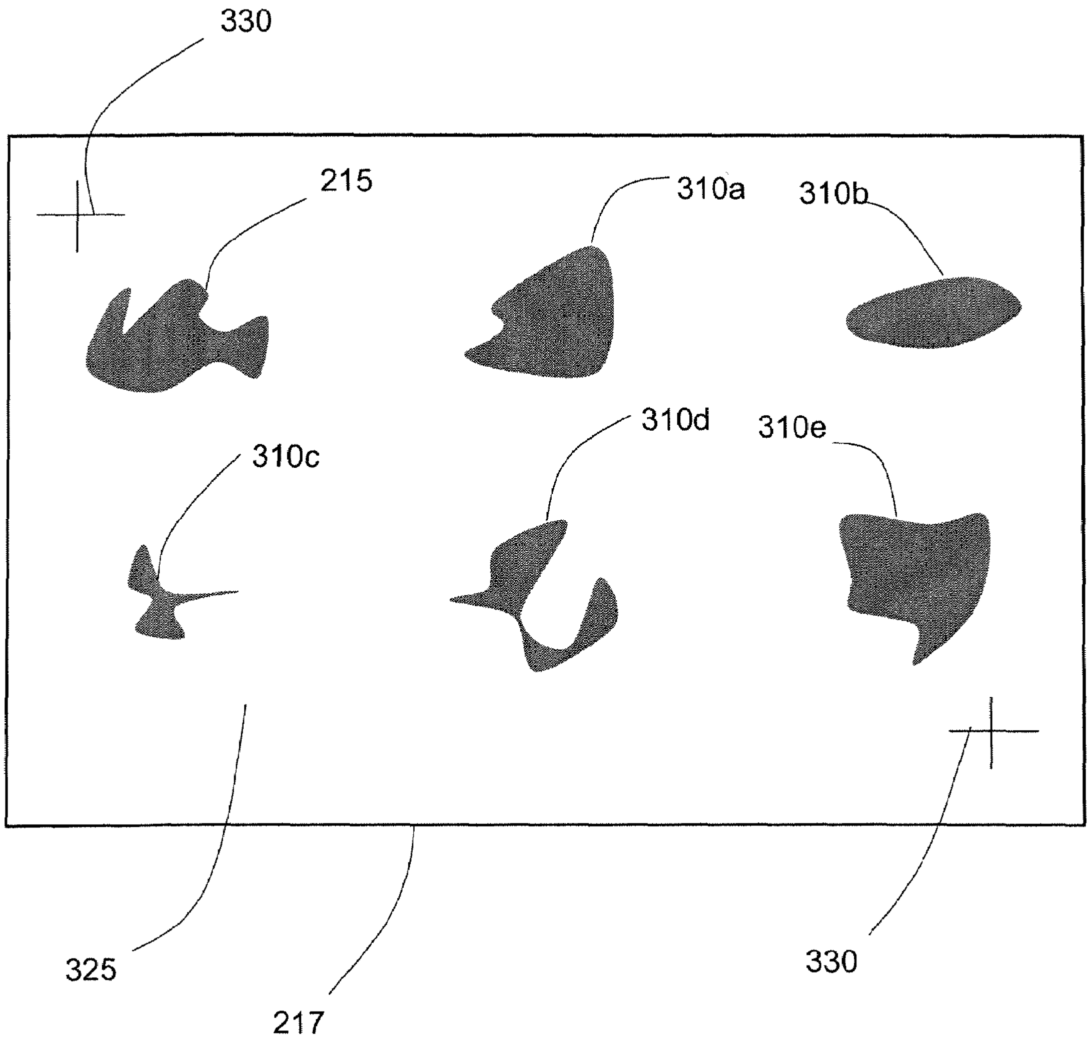
FIG. 3 is a top view of a support plate having a plurality of tissue samples held thereon.

As depicted in FIG. 3, several tissue samples (labeled as 215 and 310*a-e*) may be arranged in spaced-apart relationship on an upper surface 325 of a common sample plate 217. The tissue samples may be of varying shapes and sizes. One or more fiducials 330 may be printed or inscribed on the sample plate surface to enable calibration of the positioning mechanism and correlation of the physical coordinate system of the sample plate to a set of optical image coordinates using, for example, the methods described in U.S. patent application Ser. No. 10/649,586 entitled "Methods and Apparatus for Aligning Ion Optics in a Mass Spectrometer."

Ions produced via absorption of the laser beam energy at the sample spot are transferred by ion optics such as quadrupole ion guide 230 though one or more orifice plates or skimmers 235 into a mass analyzer device 240 for measurement of the ions' mass-to-charge ratios. The mass analyzer device 240, which is located in a high-vacuum chamber, may take the form, for example, of a TOF analyzer, quadrupole mass filter, ion trap, electrostatic trap, or FT/ICR analyzer. Typically, the ions will pass through one or more chambers of successively lower pressures separated by orifice plates or skimmers, the chambers being differentially pumped to reduce total pumping requirements. For the purpose of clarity, the chamber walls, intermediate ion optics, and pumps have been omitted from the drawings.

MS system 200 is additionally provided with a sample plate imaging system, comprising an imaging device 245 positioned to capture an optical image of the tissue sample or portion thereof, and an illumination source 250 for illuminating the optically imaged region. Imaging device 245, which may take the form of a conventional video camera having a set of CCD sensors for detecting light reflected from the imaged region, generates data representative of the optically imaged region. The image data is typically ordered into an array of pixels, wherein each pixel has image data formatted in accordance with the Y-U-V or R-G-B standards. Lenses and/or other focusing elements 252 may be positioned in the optical imaging path to provide the desired degree of magnification.

Illumination source 250 may be a laser or other single-wavelength source, or may emit radiation across a broad spectrum of wavelengths. In a typical embodiment, radiation emitted by illumination source 250 will be in the visible spectrum, but alternative embodiments may utilize an illumination source which emits light at other wavelengths (e.g., in the near-infrared band) that can be effectively detected by the sensors of imaging device 245. Light emitted by illumination source 250 may be delivered to the region to be imaged through an optical fiber 255, which obviates the need to provide mirrors and/or other beam redirecting or focusing elements. It may be advantageous to allow user or automated adjustment of operational parameters of illumination source 250, such as intensity and wavelength, in order to optimize certain image properties, e.g., image brightness or contrast to facilitate construction of a tissue imaging boundary, as described below.

Imaging device 245, controller 225, laser 210, and illumination source 250 communicate with and are controlled by processing unit 260. Processing unit 260 may be a general purpose computer equipped with suitable software for performing the required control and processing operations, but may alternatively take the form of an ASIC or other-special purpose processor. Processing unit 260 includes or is coupled to a video monitor 265 for displaying graphics and text to the instrument operator. A mouse 270 or similar input device is coupled to processing unit 260 to allow operator input. Processing unit 260 is further conventionally provided with volatile and/or non-volatile memory or storage devices for storing and retrieving data. One or more suitable interface cards or ports, such as a frame grabber card, may be utilized to enable communication between processing unit 260 and imaging device 245, controller 225, laser 210 and illumination source 250.

As described above, a mass spectral tissue image is developed by sequentially irradiating spatially separated target regions that are distributed across a tissue sample. At each location, mass spectral data is acquired, processed, and stored. The mass spectral data may represent, for example, the abundance of one or more pre-specified molecules at the target region. The time required to complete the generation of the mass spectral image will be determined by the number of irradiated target regions multiplied by the time it takes for acquisition of mass spectral data at each target region. Two discrete and independent techniques are described herein for reducing the mass spectral imaging time by more efficiently selecting target regions, thereby reducing the number of target regions that need to be irradiated to generate a mass spectral tissue image of acceptable quality. In the first technique, a tissue imaging boundary is defined that eliminates or reduces the number of irradiated target regions falling outside of the area occupied by the tissue or its regions of interest. In the second technique, a multi-step imaging process is utilized wherein an initial tissue imaging scan is performed at relatively low resolution (i.e., with a relatively small number of irradiated target regions) to identify regions of interest in the issue that are highly differentiated or have other special properties. A second, relatively high-resolution tissue imaging scan is performed to acquire high-resolution imaging data at and around the areas of interest, and a composite mass spectral tissue image is generated from the results of the first and second scans. These techniques are discussed below in turn.

Improved Tissue Imaging Boundary Definition

Figure 4:
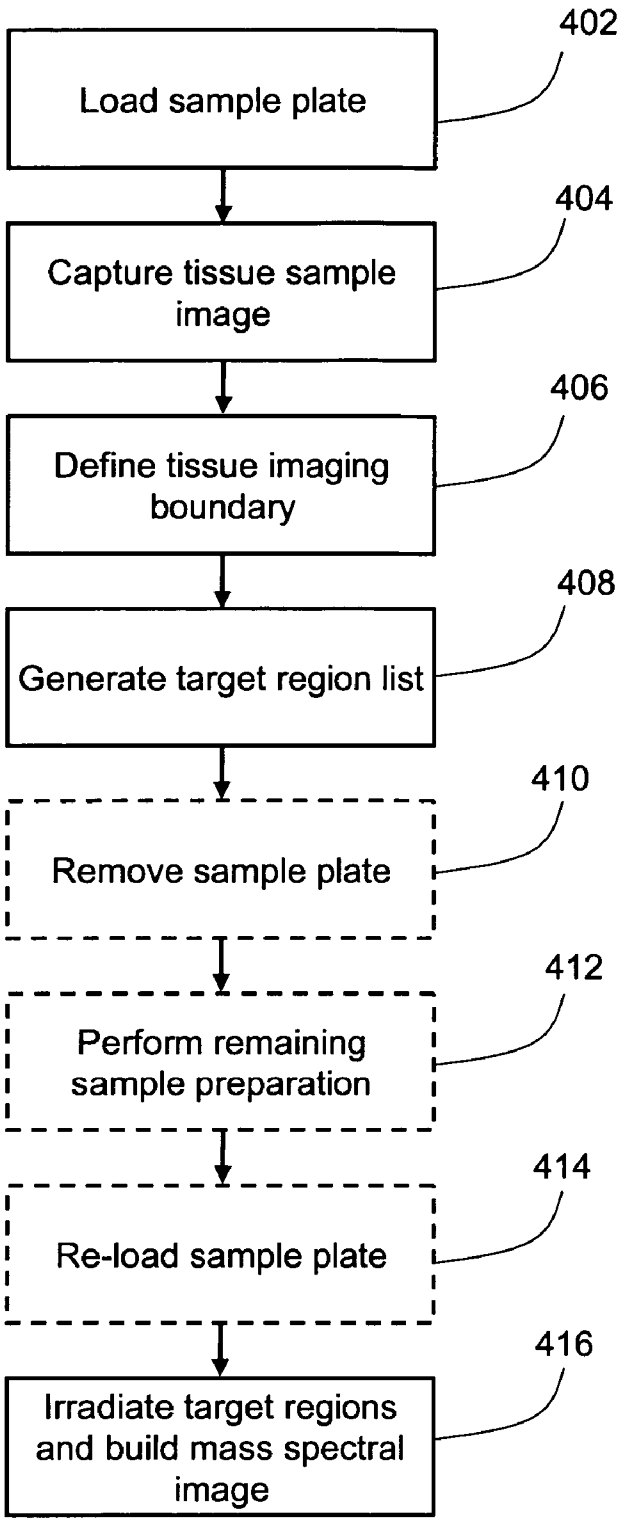
FIG. 4 is a flowchart showing steps of a method for generating a mass spectral tissue image, in accordance with a first embodiment of the invention where a tissue imaging boundary is constructed that more closely approximates the tissue sample edges or areas of interest.

The first image reduction time technique may be best understood with reference to the flowchart of FIG. 4 and the FIG. 2 schematic. In the initial step 402, sample plate 217, having at least one tissue sample 215 arranged thereon, is loaded into MS system 200. The preparation of tissue samples for mass spectral tissue imaging analysis is well known in the art (see, for example, Stoeckli et al., "Imaging Mass Spectrometry: A New Technology for the Analysis of Protein Expression in Mammalian Tissues", Nature Medicine, Vol. 4, No. 4 (April 2001)) and hence will not be discussed in detail herein. Typically, tissue samples will be prepared by sectioning frozen tissue blocks to an approximate thickness of 10-20 μm using a microtome or similar tool. The tissue sample is then carefully transferred to a sample plate. The tissue sample may be stained with an appropriate histological dye to improve the visibility of the tissue and/or specific areas of interest within the tissue sample. Where a MALDI source is used, a layer of matrix material may be applied over the tissue sample. The applied matrix layer may be applied as a continuous layer, or as an array of spots corresponding to target regions.

If the sample preparation involves procedures that partially or wholly obscure tissue sample 215 from view, such as application of a continuous matrix layer, such procedures may be deferred until the imaging boundary definition steps are completed, as will be discussed below in connection with steps 410-414.

Typically, MS system 200 will be provided with robotic handling apparatus for accepting sample plate 217 through a plate receiver slot and transporting the plate from the slot to holder 220. Once engaged with sample plate holder 220, sample plate 217 is positioned in the X-Y plane such that imaging device 245 views tissue sample 215. Positioning of sample plate 217 may be performed under operator control; in such an implementation, the image viewed by imaging device 245 may be continuously displayed on monitor 265 to enable the operator to properly frame the tissue sample within the image window by, for example, entering commands or other user input specifying the direction(s) of movement. Alternatively, positioning of sample plate 217 to frame the tissue sample image may be performed in a fully automated fashion without operator intervention, using known image processing algorithms and/or predetermined information characterizing the position of tissue sample 215 relative to known features (e.g., fiducials) on the sample plate 217.

Once sample plate 217 is positioned such that imaging device 245 views tissue sample 215, an image of tissue sample 215 is acquired by imaging device 245 and conveyed to processing unit 260, step 404. In some instrument geometries, certain structures (such as ion guide 230) may lie in the viewing path of imaging device 245, thereby obscuring a portion of the tissue sample 215. One solution to this problem is to create a composite image derived from multiple images obtained at different viewpoints. This may be accomplished, for example, by acquiring a first image in which a portion of the tissue sample is obscured, displacing sample plate 120 in the X- and/or Y-direction so that the obscured portion of the tissue sample is visible, acquiring a second image, and then stitching the two images together using known image processing techniques. Depending on the instrument geometry and degree to which the image is obscured, it may be necessary to acquire and stitch together several images taken at different viewpoints in order to produce a composite image in which all of the tissue sample is visible. Processing unit 260 may apply one or more image enhancement or transformation routines to the raw image data in order to ensure that the tissue sample edges are visible or detectable.

Figure 5:
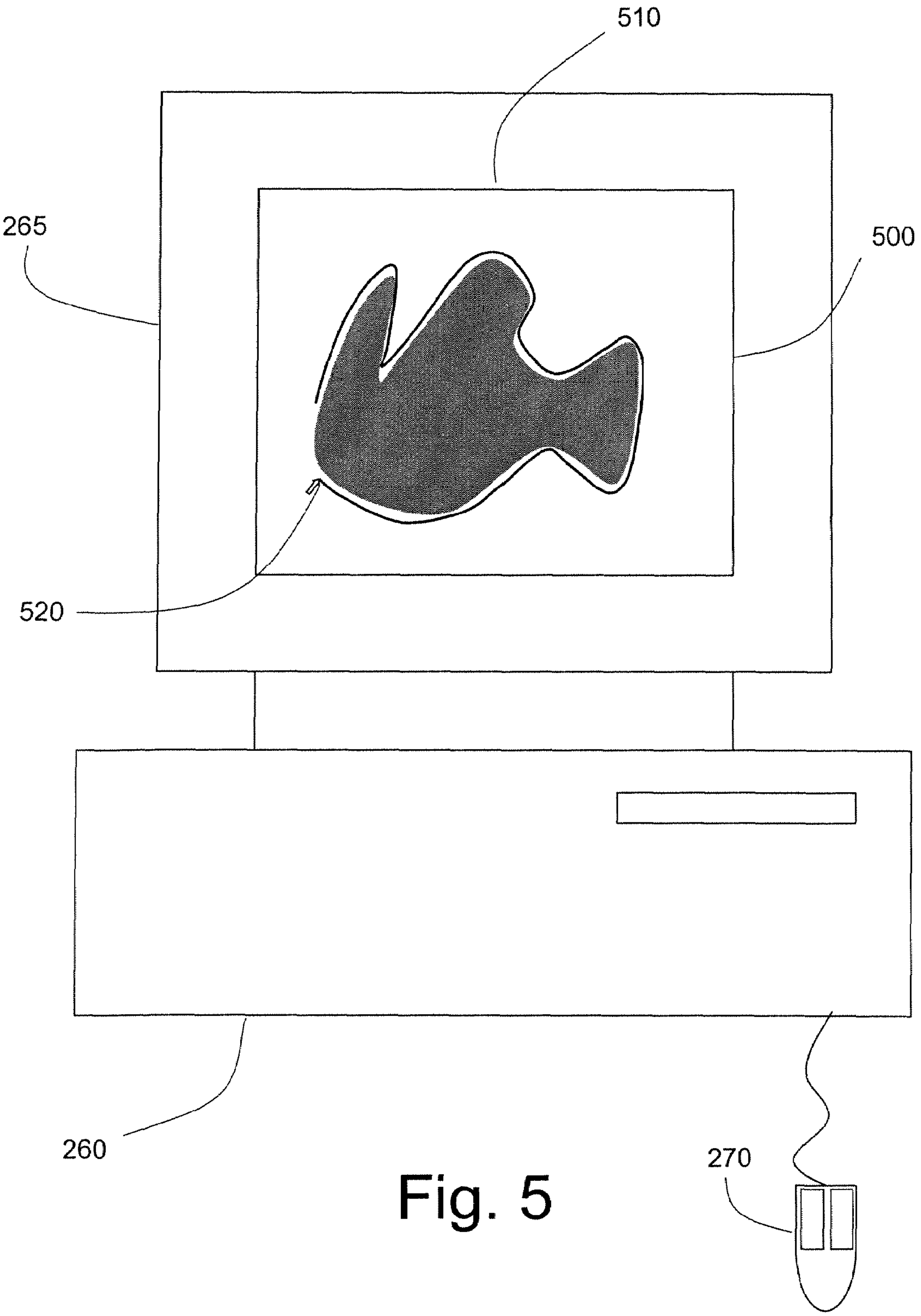
FIG. 5 depicts a computer monitor displaying a graphical user interface screen through which operator input representative of the tissue imaging boundary may be entered.

In the next step 406, the tissue imaging boundary is defined with reference to the optical image of tissue sample 215. This may be accomplished in a semi-automated manner by displaying the tissue sample image to the operator and receiving operator input representative of the desired imaging boundary. FIG. 5 depicts a graphical user interface 510 displayed on monitor 265 of processing unit 260, which includes a window in which the tissue sample image is displayed. The operator may specify the tissue imaging boundary by drawing a border 520, displayed in the tissue image window, using mouse 270 or other suitable input device. Preferably, border 520 may take the form of an unconstrained, free-drawn shape so that it can closely approximate the tissue sample edges (or the edges of areas of interest within the tissue sample). The operator input may be stored as a set of coordinates that can be transformed or otherwise related to the physical coordinate system of the tissue sample and sample plate. In an alternative implementation, border 520 may be constrained to an elliptical or other non-rectangular shape capable of more closely approximating the tissue sample edges relative to a rectangular-shaped border. In this implementation, the operator may specify parameters defining the ellipse or other non-rectangular shape through the user interface, e.g., by clicking on points defining the ellipse.

As noted above, the operator may adjust one or more imaging parameters (illumination intensity, wavelength, polarization) so that the tissue sample edges may be more clearly discerned in the image displayed on the monitor.

As an alternative to the semi-automated process described above, the tissue imaging boundary may be implemented in a fully automated fashion. According to this implementation, well-known edge detection algorithms may be applied to the tissue image data to identify points of discontinuity in the pixel luminance and/or chrominance (e.g., by comparing a pixel's values to those of the neighboring pixels) and thereby locate the tissue edges. The tissue imaging boundary may then be constructed by connecting the points of discontinuity to form a border that approximates the tissue edges. The border may be stored as a set of coordinates that can be transformed or otherwise related to the physical coordinate system of the tissue sample and sample plate.

Figure 6:
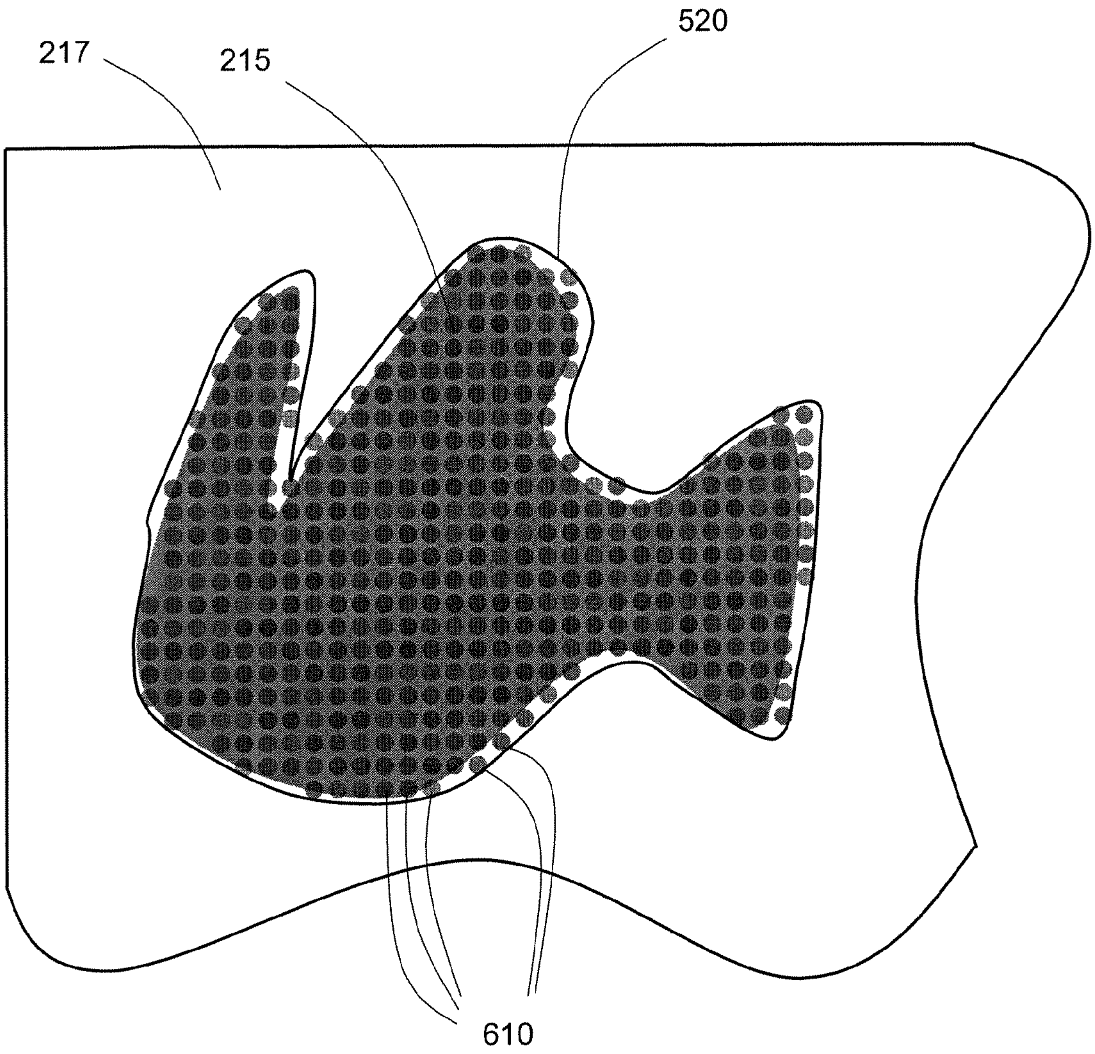
FIG. 6 depicts a tissue sample and associated irradiation target regions, wherein the tissue imaging boundary takes the form of a free-drawn shape.

After the imaging boundary has been defined, processing unit 260 generates a list of target regions (shown in FIG. 6 as gray dots 610) lying inside the imaging boundary to be irradiated for mass spectral imaging, step 408. Target regions 610 will typically be ordered in a rectilinear grid spanning the imaged area with constant lateral spacing between adjacent target regions. The lateral spacing distance will depend primarily on the laser spot size and the desired resolution. As shown, all target regions 610 have areas that lie at least partially inside border 520. The exclusion of locations wholly outside of the tissue imaging boundary from the list of target regions 610 substantially reduces the number of irradiated target regions that occupy bare plate or other areas devoid of tissue sample and which consequently do not produce meaningful mass spectral data. The list of target regions, including the location data for each target region, is stored for subsequent use in the image scan process.

In optional step 410, sample plate 217 is removed from the mass spectrometer for further tissue sample preparation steps. As alluded to above, certain sample preparation procedures, such as application of a continuous matrix layer, may obscure tissue sample 215 from view, thereby making it difficult or impossible to locate the edges of the tissue sample in the image. In order to avoid this problem, the tissue imaging boundary may be defined in accordance with steps 402-408 prior to executing the matrix layer application or similar procedure. Sample plate 217 is then removed from the mass spectrometer to allow access to the tissue sample for the additional sample preparation step(s) 412. Once completed, the sample plate is re-loaded into mass spectrometer, step 414. It will be recognized that the "home" position of the sample plate, when re-loaded into the mass spectrometer, may be slightly offset with respect to its previous home position due to the inherent operational variability associated with the handling and positioning mechanisms. Since the target locations are determined with reference to a physical coordinate system (i.e., X and Y coordinates), it is important that any positional or angular offset be detected and corrected for in order to ensure that the correct locations on the tissue sample (i.e., the target locations selected in accordance with steps 402-408) are irradiated. This may be achieved by, for example, analyzing the image of fiducial or alignment marks inscribed or printed on the sample plate. An example of one technique utilizing fiducial marks is disclosed in U.S. patent application Ser. No. 10/649,586.

The mass spectral tissue image is then built by sequentially irradiating the individual target regions 610, step 416. The number of laser beam pulses delivered to each target region will depend on various experimental conditions and operational/performance considerations, including the tissue thickness and absorptivity, laser energy and spot size, abundance of the molecule(s) of interest, and instrument sensitivity. Ions produced by irradiation of a target region are captured by ion optics 230 and transported to mass analyzer 240, which generates signals representative of the abundances of ions derived from the tissue sample. Mass analyzer 240 may be operated to scan and detect ions across a range of mass-to-charge ratios, or alternatively may be operated to selectively monitor ions having a pre-specified mass-to-charge ratio. Mass analyzer 240 may additionally fragment ions produced from tissue sample 215 and analyze one or more of the resulting product ions. Signals generated by mass analyzer 240 are conveyed to processing unit 260, which transforms the signals into an appropriate data format and associates the mass spectral data with the location of the tissue sample from which the ions were produced.

The mass spectral tissue imaging data acquired in step 416 may be displayed to the user using one or a combination of graphical representations, such as a false color image (where each color represents a range of abundance values for an ion having a selected mass-to-charge ratio), or a three-dimensional surface map. Techniques for constructing graphical representations of the mass spectral imaging data are well-known in the art and need not be discussed herein. In certain implementations, the graphical representation may be customized according to user-specified parameters; for example, the user may input one or more values of mass-to-charge ratio, and processing unit 260 will responsively construct and display a false-color map or other graphical representation depicting the abundance of ions at the selected mass-to-charge ratio(s).

Multi-Scan Tissue Imaging

Figure 7:
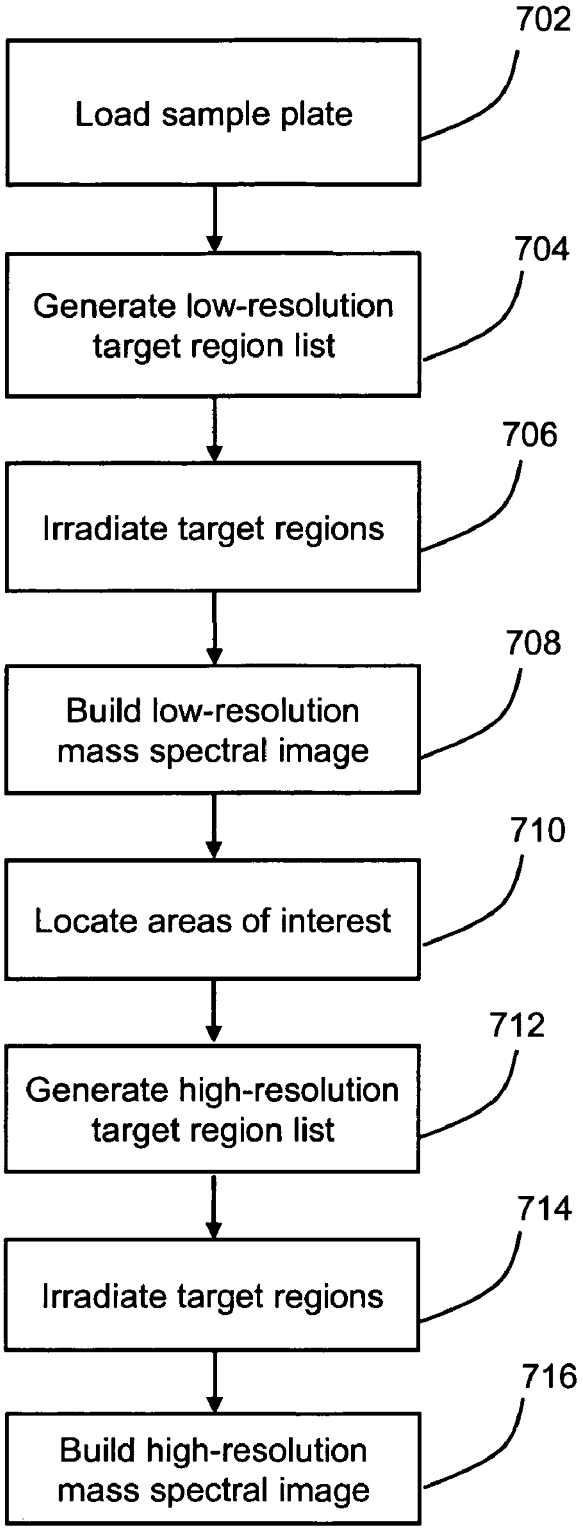
FIG. 7 is a flowchart showing steps of a method for generating a mass spectral tissue image in accordance with a second embodiment of the invention that employs an initial low-resolution imaging step to identify areas of the tissue at which high-resolution imaging is appropriate.

The second imaging time reduction technique may be more easily explained with reference to the flowchart of FIG. 7 and the tissue samples depicted in FIGS. 8-11. Generally described, this technique involves performing a first mass spectral tissue imaging scan at a first, relatively low resolution, processing the mass spectral tissue image to identify one or more areas of interest, e.g., an area of high differentiation with respect to the abundance of an ion having a selected mass-to-charge ratio, and then performing a second mass spectral tissue imaging scan within the identified areas of interest. The data produced by the first and second scan can then be combined to form the final mass spectral image.

In the first step 702, a sample plate 217 with at least one tissue sample 215 arranged thereon is loaded into MS system 200. The tissue sample preparation and loading of the sample plate may be accomplished in much the same way as described above in connection with the step 402 of FIG. 4.

Next, a list of low-resolution scan target regions is generated, step 704. This step may advantageously employ the tissue imaging boundary definition technique described above in order to eliminate or reduce the number of target regions that lie outside of the tissue sample or are otherwise unlikely to yield meaningful mass spectral data. Alternatively, the prior art rectangular imaging boundary technique may be employed, but at a cost of increased total scan time and reduced efficiency.

Figure 8:
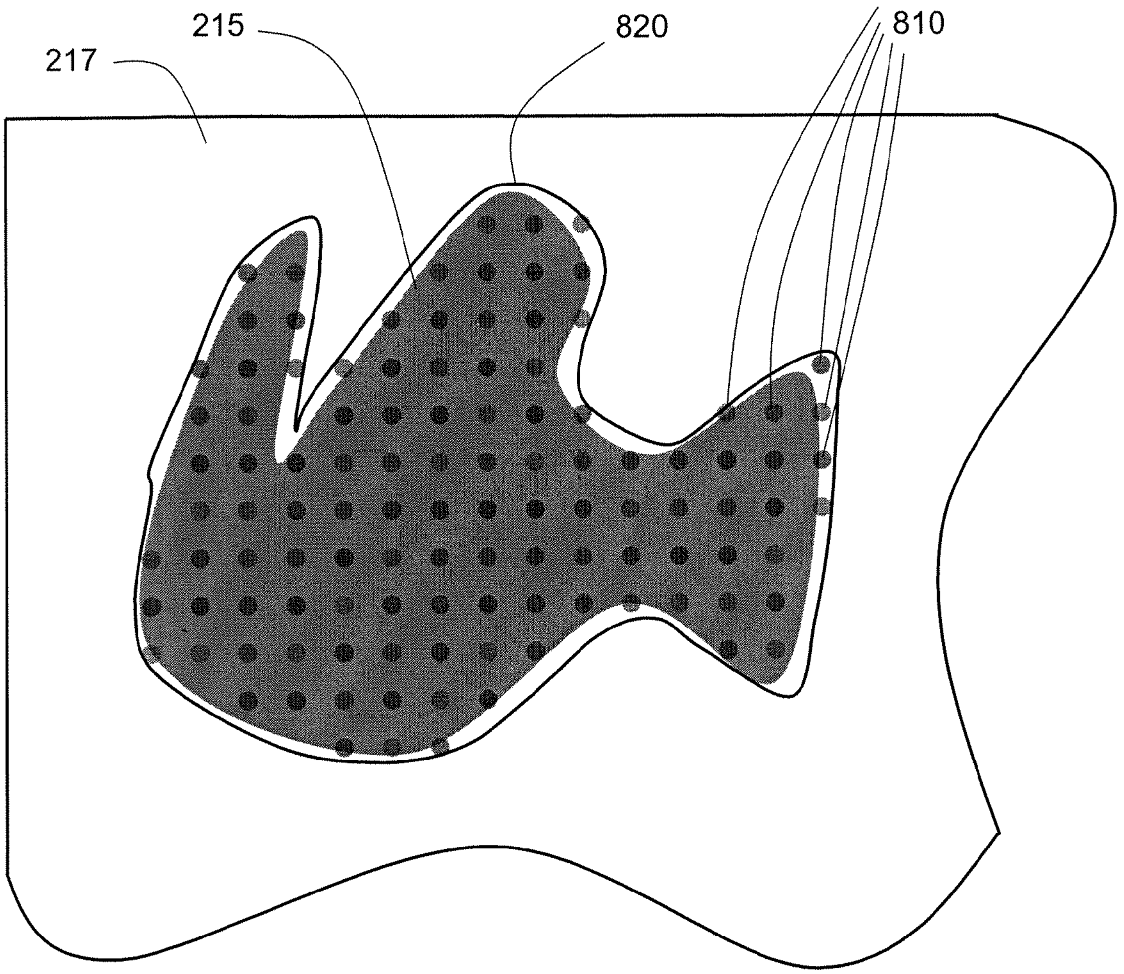
FIG. 8 depicts a tissue sample and superimposed target regions corresponding to an initial low-resolution mass-spectral image acquired to identify of areas of interest for high-resolution imaging according to a first implementation, wherein the low-resolution target regions are ordered in a rectilinear grid.

Referring to FIG. 8, target regions 810 may be ordered in a rectilinear grid that spans the area bound by tissue imaging border 810. The distance between adjacent target regions 810 is relatively large (typically on the order of 300-400 μm) such that the total number of target regions will be significantly smaller than the number of target regions 810 that would be irradiated in a conventional, high-resolution scan. In an exemplary implementation, the distance between adjacent target regions 810 is at least 2 times greater, and more preferably 3-4 times greater, than the distance between target regions irradiated within the area(s) of interest, as described below.

Figure 9:
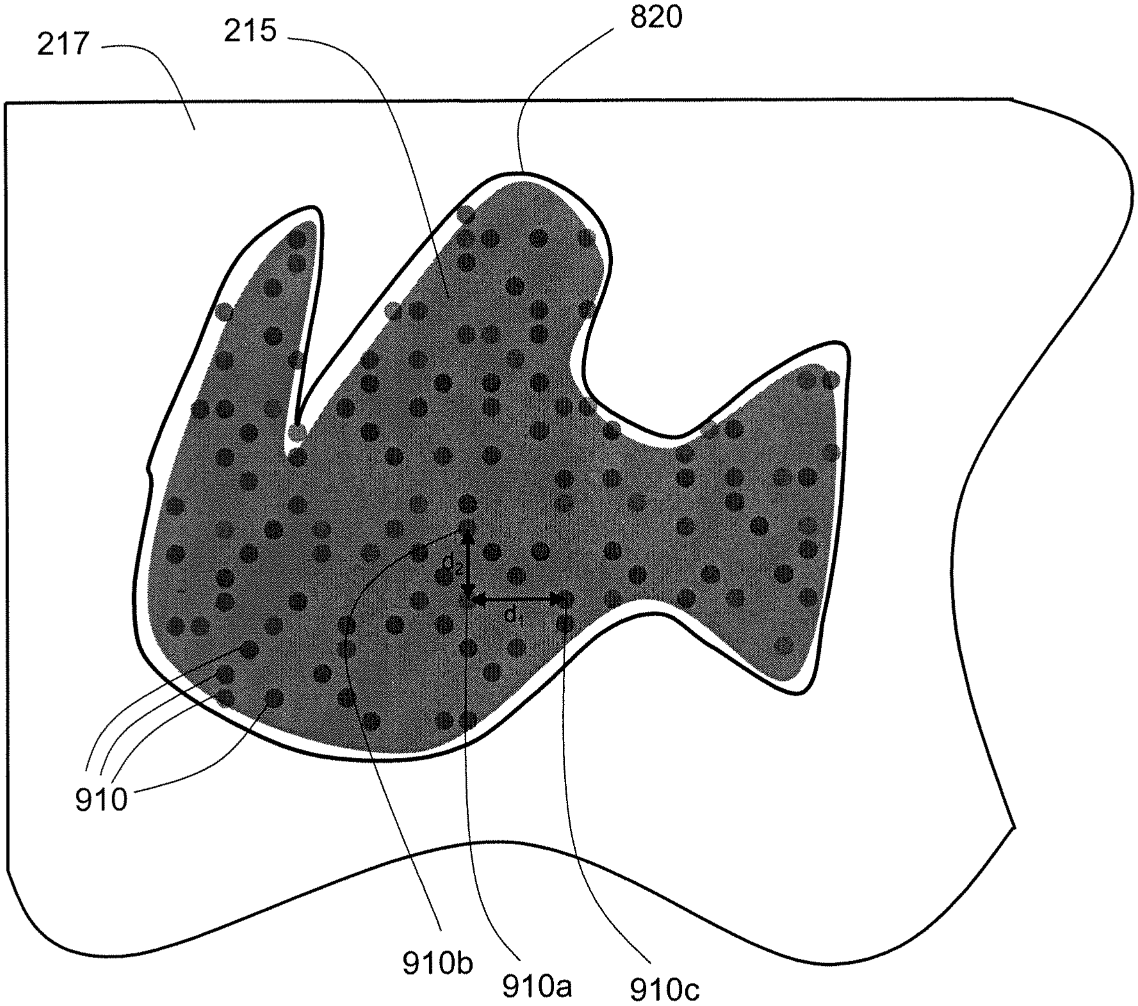
FIG. 9 depicts a tissue sample and superimposed low-resolution target regions wherein the target regions are randomly distributed.
Figure 10:
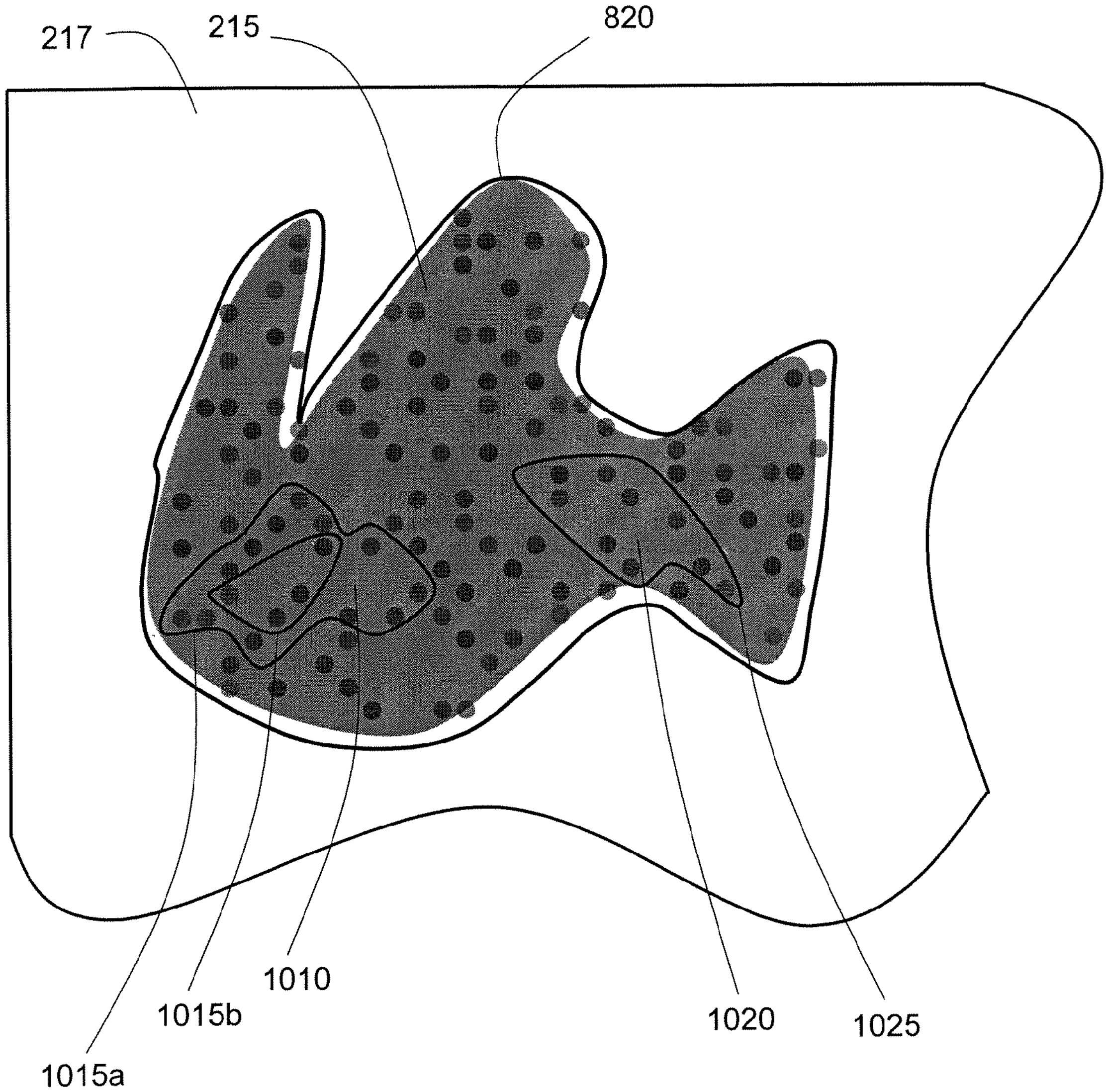
FIG. 10 depicts areas of interest identified by irradiating the target regions of FIG. 9.

FIG. 9 depicts an alternative arrangement of target regions 910 for the low-resolution scan, wherein the target regions 910 are randomly distributed across the area to be imaged.

Various randomization algorithms may be employed to distribute the target regions in a random fashion. In one exemplary implementation, processing unit 260 generates a low-resolution target region list by randomly selecting a subset of target regions from a high-resolution target region list (which is a list of target regions ordered in a regular grid covering the area defined by the imaging boundary and spaced at a distance appropriate to a high-resolution imaging scan). The subset will typically represent a small portion (e.g., 10-15 percent) of the total number of target regions in the high-resolution list; for example, if the high-resolution target list has 10,000 target regions, then the low-resolution list may constitute a total of 1000 target regions randomly selected from the high-resolution list. According to well-established sampling theories, a low-resolution scan utilizing a randomized distribution of target regions may be more likely to locate areas of high spatial differentiation relative to a low-resolution scan using the same number of target regions arranged in an ordered (e.g., grid) pattern.

Next, in step 706 MS system 200 performs a first imaging scan at low resolution by sequentially irradiating each target region on the low-resolution target region list. The number of laser beam pulses delivered to each target region will depend on various experimental conditions and operational/performance considerations, including the tissue thickness and absorption, laser energy and spot size, abundance of the molecule(s) of interest, and instrument sensitivity. Ions produced by irradiation of a target region are captured by ion optics 230 and transported to mass analyzer 240, which generates signals representative of the abundances of ions derived from the tissue sample. As alluded to above, mass analyzer 240 may be operated to scan and detect ions across a range of mass-to-charge ratios, or alternatively may be operated to selectively monitor ions having a pre-specified mass-to-charge ratio. Mass analyzer 240 may additionally fragment ions produced from tissue sample 215 and analyze one or more of the resulting product ions. Signals generated by mass analyzer 240 are conveyed to processing unit 260, which transforms the signals into an appropriate data format and associates the mass spectral data with the location of the tissue sample from which the ions were produced to build a low-resolution mass spectral image, step 708.

In the next step 710, the low-resolution mass spectral image data are processed to identify one or more areas of interest within tissue sample 215. Various criteria may be applied for determining which portions of the tissue sample are to be considered areas of interest. One or more of these criteria or parameters associated therewith may be selected or specified by the operator; alternatively the criteria and associated parameters may be predetermined and encoded in the data processing routines. In a first example, the criteria will be directed to identifying highly spatially differentiated regions in the tissue sample, i.e., those regions exhibiting relatively large spatial gradients in the abundance(s) of one or more analyte molecules. In another example, the criteria may identify areas having abundance(s) of analyte molecules outside of (above or below) a range of values.

Identification of the area(s) of interest is preferably implemented as a fully automated technique, whereby processing unit 260 analyzes the mass spectral data according to predetermined algorithms to locate the area(s) at which the criteria are met. In the first example, highly spatially differentiated areas may be identified by calculating, for each target region, spatial gradients in the values of mass spectral data (representative, for example, of the abundance of an ion of a selected mass-to-charge ratio). This may be simply accomplished by subtracting the data value of the (upwardly/downwardly or rightwardly/leftwardly adjacent target region and dividing (in the case of randomly distributed target regions) the calculated difference by the spacing between the target regions. Referring to FIG. 9, the gradient in the rightward direction may be calculated for target region 910*a* by subtracting the data value obtained for target region 910*c* and dividing by $d_1$; the upward gradient may be calculated by subtracting the target region 910*b* data value and dividing by $d_2$, and so on. Of course, processing unit 260 may utilize any other appropriate algorithm for calculating gradients. After all of the gradients have been calculated, processing unit may then identify one or more areas of interest each being defined by a group of neighboring target regions having gradient values exceeding a minimum value. Processing unit 260 may apply filtering, clustering, or similar operations to avoid or minimize the erroneous identification of areas of interest resulting from the presence of noisy or otherwise anomalous mass spectral data. In the example depicted in FIG. 10, two areas of interest 1010 and 1020, respectively defined by borders 1015*a/b* and 1025, have been identified based on the mass spectral data obtained by irradiating target regions 910.

Identification of the area(s) of interest may be alternatively implemented as a semi-automated technique, wherein the mass spectral image acquired during the low-resolution scan is displayed to the operator in an appropriate graphical form such as a false-color image. The operator may then visually identify areas having certain characteristics, e.g., a high degree of spatial differentiation, and select those areas for high-resolution imaging by, for example, using a mouse or similar input device to draw borders encircling the areas exhibiting the desired characteristics.

Figure 11:
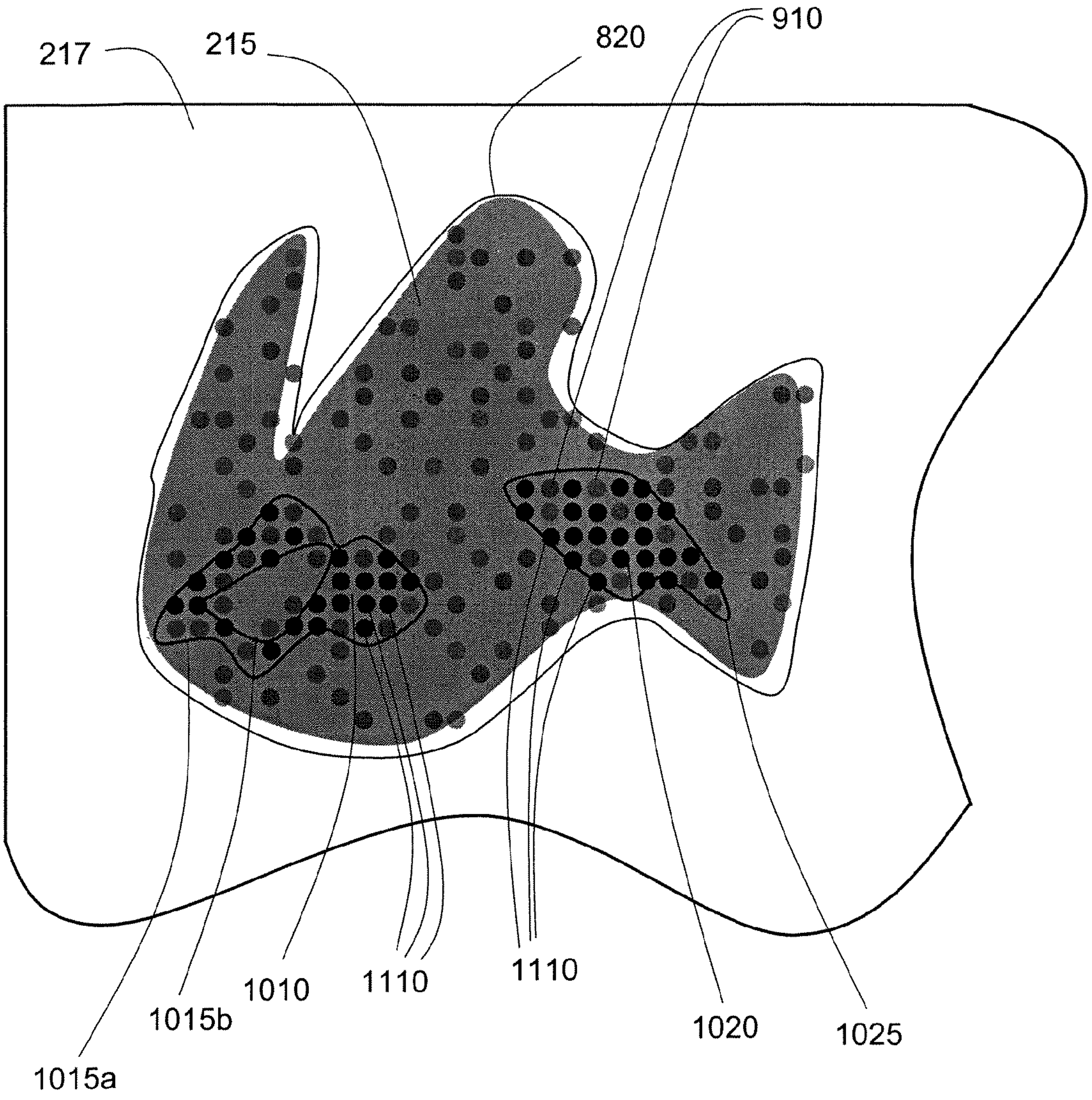
FIG. 11 depicts a tissue sample and superimposed target regions corresponding to a high-resolution imaging step, wherein areas of interest of the tissue sample are imaged at high resolution.

Once the areas of interest have been identified by applying the appropriate criteria to the mass spectral data acquired during the first scan, a list of high resolution target regions is generated, step 712. Referring to FIG. 11, the high-resolution target regions 1110 (represented as black dots) are disposed within the identified areas of interest 1010 and 1020, and are distributed so as to "fill in" locations within the areas of interest. The high-resolution target region list will typically not include target regions 910 irradiated during the low-resolution scan (depicted as gray dots in FIG. 11), since mass spectral data has already been acquired at these target regions, and also because these regions may be depleted of the sample. The spacing between adjacent target regions within the area of interest (as collectively represented by the gray and black dots) is significantly reduced compared to the spacing (or average spacing) of the target regions used for the low-resolution scan (represented by the gray dots only); typically the average target region spacing within the area(s) of interest will be equal to or less than one-half of (and more preferably one-third to one-quarter of) the average target region spacing outside of the area(s) of interest. Of course, the target region spacing selected will depend on the desired resolution of the areas of interest, as well as on the laser spot size, positioning precision of the sample plate holder, and other operational parameters and limitations.

Next, MS system 200 performs a second imaging scan at high resolution by sequentially irradiating each target region 1110 on the high-resolution target region list, step 714. Preferably, the operational parameters employed for the high-resolution scan (laser energy, number of pulses, and mass analyzer settings) will be consistent with those employed for the low-resolution scan so that the sensitivity of the MS system 200 is maintained approximately constant. Again, signals generated by mass analyzer 240 are conveyed to processing unit 260, which formats the signals into the appropriate data format and associates the mass spectral data with the location of the tissue sample from which the ions were produced.

After the high-resolution scan has been completed, processing unit 260 may build a composite resolution mass spectral image by aggregating the mass spectral data from the low-resolution and high-resolution scans, step 716. The resultant mass spectral image is relatively highly resolved within the areas of interest 1010 and 1020 and more coarsely resolved outside the areas of interest. However, because the areas of tissue sample 215 lying outside of the areas of interest are spatially homogeneous or otherwise lack noteworthy properties, the exclusion of such areas from the high-resolution scan will not compromise the overall imaging data quality. Moreover, by excluding these areas from the high-resolution scan, the number of irradiated target regions and consequently the aggregate scan time are substantially reduced relative to the prior art technique of performing a high-resolution scan over the entire imaged area. The composite mass spectral image may be displayed to the operator using one or more known graphical representations, such as a false-color image or three-dimensional surface map.

It should be noted that the technique described herein is not limited to two scanning stages (i.e., low-resolution and high-resolution), but may instead be expanded to three or more stages of progressively finer resolution. In such an implementation, the mass spectral data produced in the second scan is analyzed according to predetermined criteria to identify one or more sub-areas of interest lying within the area(s) of interest used for the second scan, e.g., very highly spatially differentiated areas. A third scan may then be performed by irradiating a set of more closely-spaced (relative to the target region spacing of the second scan) target regions extending over the sub-area(s). The data thus produced may be analyzed to select areas within the sub-areas for a fourth, higher resolution scan, and so on.

Those skilled in the art will recognize that the time-reduction benefits realized by the above-described technique may be even greater in applications where multiple-stage mass analysis ($MS^n$) is employed. Because acquisition of $MS^n$ spectra may involve numerous cycles of ion injection, fragmentation, and mass scanning, the acquisition times required can be significantly longer than those required for simple MS analysis. For this reason, it may be highly beneficial to limit $MS^n$ analysis to those areas within the tissue sample that are highly differentiated or exhibit other properties of characteristics of interest. In a variation of the method described above, a low-resolution MS scan may be performed to locate areas of interest in which subsequent high-resolution $MS^n$ scans are conducted.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for generating a mass spectral image of a tissue sample, comprising steps of:

establishing a tissue imaging border based on operator input;

performing a first scan at relatively low spatial resolution by irradiating a first set of target regions that span the area bound by the tissue imaging border and acquiring mass spectral data at each target region of the first set of target regions;

analyzing the mass spectral data from the first scan using a processing unit by calculating spatial gradients in the values of the mass spectral data to identify at least one area of interest within the tissue sample having a relatively highly spatially differentiated abundance of ions having a selected mass-to-charge ratio;

performing a second scan at relatively high spatial resolution by irradiating a second set of target regions located within the at least one identified area of interest and acquiring mass spectral data at each target region of the second set of target regions;

combining the mass spectral data from the first and second scans; and using the combined mass spectral data, displaying an image representing the spatial distribution across the tissue sample of at least one ion having a selected mass-to-charge ratio, wherein the displayed image is highly spatially resolved within a region corresponding to the at least one identified area of interest relative to regions corresponding to areas of the tissue lying outside of the at least one identified area of interest.

2. The method of claim 1, wherein the average spacing between target regions irradiated within the at least one area of interest is equal to or less than one-half of the average spacing between target regions irradiated outside of the at least one area of interest.

3. The method of claim 1, wherein the target regions in the first set are distributed according to a randomized process.

4. The method of claim 3, wherein the target regions in the first set are randomly selected from a high-resolution target region list.

5. The method of claim 1, wherein the tissue imaging border is a non-rectangular tissue imaging border.

6. The method of claim 1, wherein the step of establishing the tissue imaging border includes:

displaying an optical image of the tissue sample; and displaying the tissue imaging border superimposed on the image of the tissue sample.

7. A mass spectrometer system, comprising:

a radiation source for irradiating selected target locations of a tissue sample to produce analyte ions;

a mass analyzer for generating mass spectral data representative of an abundance of at least one analyte ion or fragment thereof; and a processing unit configured to:

establish a tissue imaging border based on operator input;

cause the radiation source to sequentially irradiate a set of low-resolution target regions that span the area bound by the tissue imaging border;

analyze mass spectral data associated with each of the low-resolution target regions by calculating spatial gradients in the values of the mass spectral data to identify at least one area of interest within the tissue sample having a relatively highly spatially differentiated abundance of ions having a selected mass-to-charge ratio;

cause the radiation source to sequentially irradiate a set of high-resolution target regions lying within the at least one area of interest;

combine the mass spectral data acquired at the low-resolution and high-resolution target regions; and using the combined mass spectral data, display an image representing the spatial distribution across the tissue sample of at least one ion having a selected mass-to-charge ratio, wherein the displayed image is highly spatially resolved within a region corresponding to the at least one identified area of interest relative to regions corresponding to areas of the tissue lying outside of the at least one identified area of interest.

8. The mass spectrometer system of claim 7, wherein the set of low-resolution target regions are randomly distributed.

* * * * *